Sept. 2, 1952  R. F. DARLING  2,609,237
SPRAYER STOP VALVE
Filed Feb. 24, 1947  3 Sheets-Sheet 3

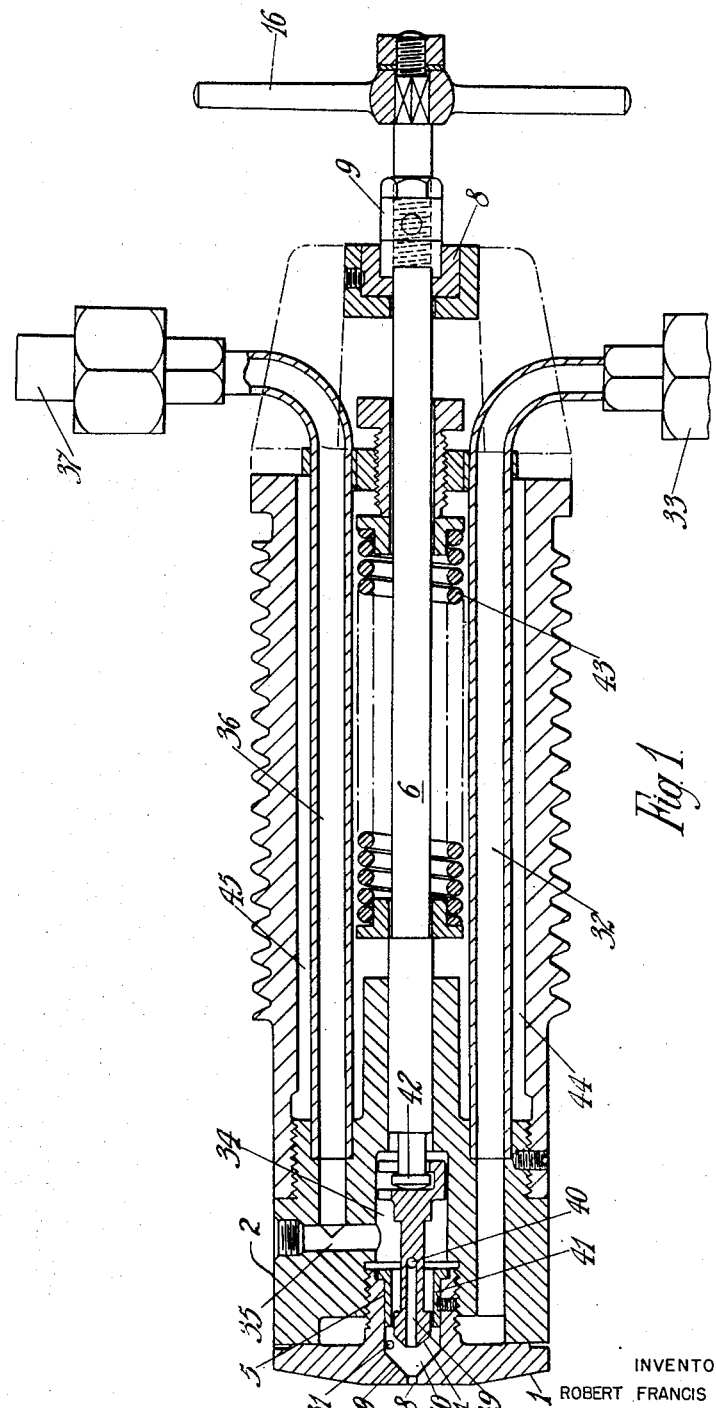

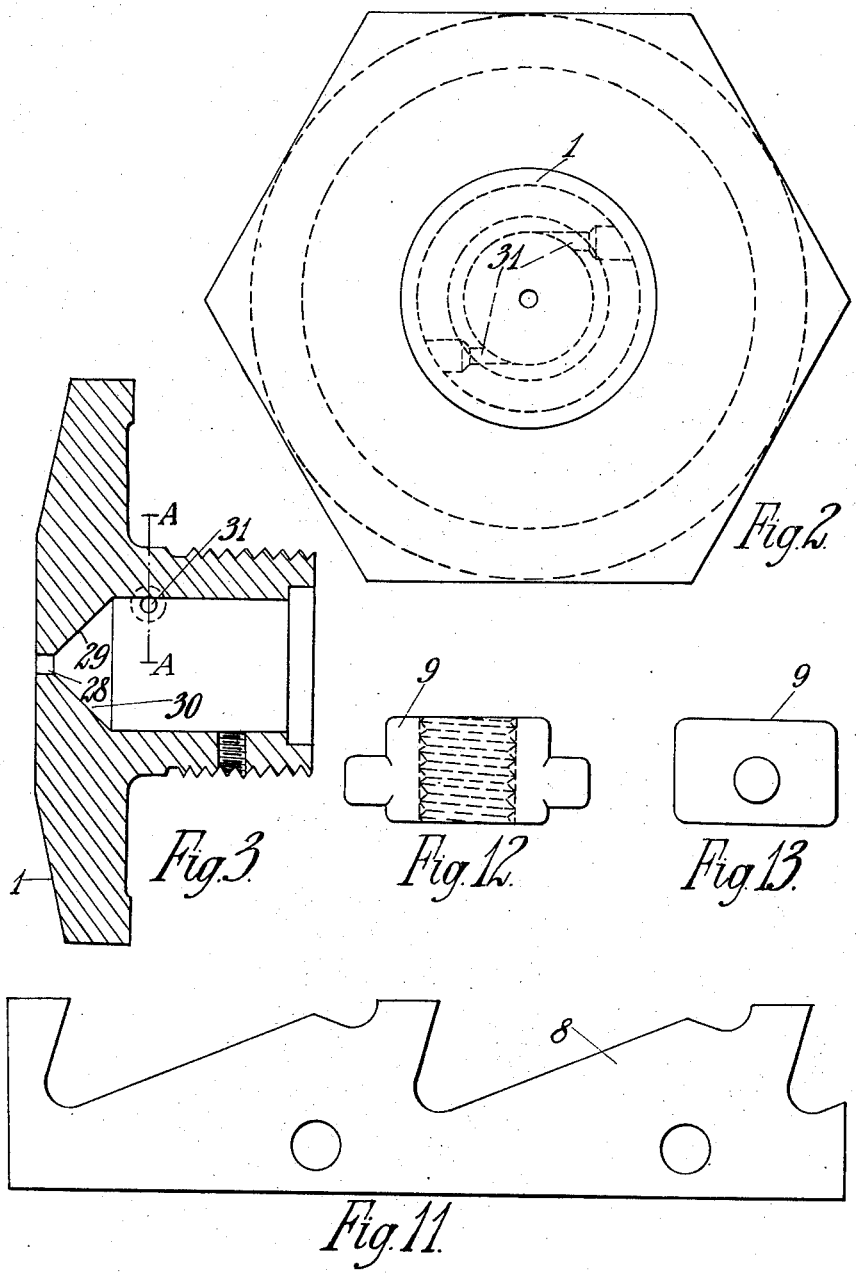

INVENTOR
ROBERT FRANCIS DARLING
BY *Sawyer & Kennedy*
ATTORNEYS

Patented Sept. 2, 1952

2,609,237

UNITED STATES PATENT OFFICE 2,609,237

SPRAYER STOP VALVE

Robert Francis Darling, Monkseaton, England, assignor to The Parsons and Marine Engineering Turbine Research and Development Association, Wallsend, England Application February 24, 1947, Serial No. 730,226
In Great Britain May 7, 1946

4 Claims. (Cl. 299—118)

This invention relates to valves for stopping or starting the flow of fluid in a duct or pipe.

The invention is particularly, but not exclusively, applicable to systems of governing, e. g. of hydraulic fluid or fuel for combustion systems and to sprayers for delivering atomised spray to combustion chambers.

In the case of sprayers used as oil burners in combustion systems, it is desirable to secure quick ignition particularly where any fuel in use is of a coarse grade requiring preheating in order to increase its fluidity.

The normal practice in warming such fuels prior to lighting up is to circulate the fuel through the supply pipe to a point near the sprayer inlet and thence back to the tank via a special return line. When the fuel has reached the required temperature it is admitted to the sprayer, but because the metal of the sprayer is still cold the first fuel to enter is considerably cooled by the time it reaches the outlet orifice. Furthermore, owing to the appreciable volume of the fuel passages in the sprayer, the pressure at the entry to the swirl chamber takes one or two seconds to build up to its maximum value. The result is that an appreciable quantity of fuel enters the combustion chamber before an ignitable spray is formed.

In the case of sprayers that have to be left in a hot region after the fuel is shut off, e. g. in the case of a gas turbine with reheat, where at low load the fuel is cut off from the reheat combustion chamber but hot gas continues to flow through, there is a great danger that the fuel which is left lying stagnant in the sprayer will be decomposed by the heat and form a tarry deposit which blocks up the passages of the sprayer.

In the case of systems where large quantities of fluid are passing, with stop valves customarily employed, it is normally necessary to employ a surge vessel for the purpose of absorbing the kinetic energy of the fluid when shutting off, e. g. in a hydraulic circuit.

The main object of the present invention is to provide improved or simplified forms of stop valves and fluid sprayers embodying same in which the above drawbacks are avoided and in which the need for employing a surge vessel is eliminated.

The invention consists in a stop valve incorporating features as set forth in the claims appended hereto.

Referring to the accompanying diagrammatic drawings:

Figure 1 is a longitudinal sectional view of one convenient construction of oil sprayer incorporating the present invention.

Figure 2 is an enlarged end view thereof.

Figure 3 is an enlarged vertical sectional view of a detail.

Figure 11 is a developed view of the outside of the cam.

Figures 12 and 13 are enlarged side views of the cam follower.

Figure 8:
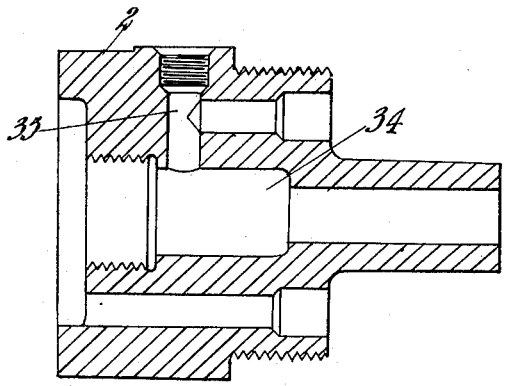
Figure 8 is an enlarged vertical sectional view of the sprayer body.
Figure 4:
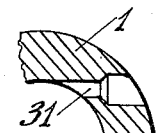
Figure 4 is a cross-sectional view on the line A—A of Figure 3.
Figures 5, 6:
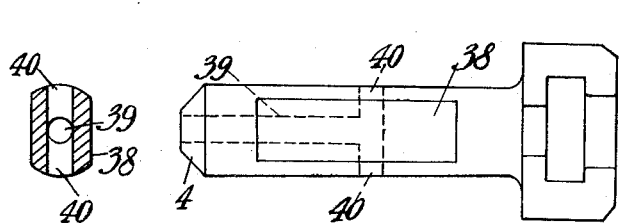
Figure 5 is an enlarged elevational view of the shut-off valve.
Figure 6 is a cross-sectional view of the shut-off valve.
Figure 7:
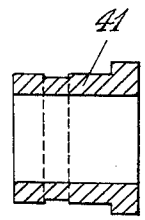
Figure 7 is an enlarged vertical sectional view of the shut-off valve bush.
Figure 9:
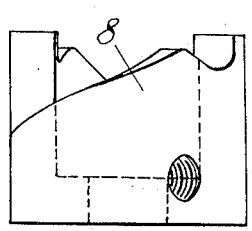
Figure 9 is an enlarged elevational view of the cam.
Figure 10:
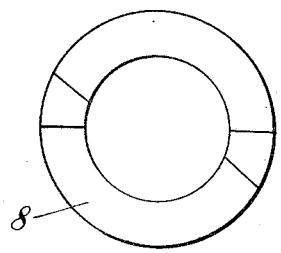
Figure 10 is an enlarged view thereof.

In carrying the invention into effect in one convenient form illustrated by way of example in Figures 1 to 13 as applied to an oil sprayer for a combustion chamber, a casing 2 is provided one end of which is furnished with a jet opening 28 and seating 29 for a plunger valve 4. Adjacent to the jet opening within the casing a swirl chamber 30 is provided connected by ducts 31 and pipe 32 passing through the interior of the casing to the remote end where it is connected to a supply pipe union 33.

An enlarged cavity 34 communicates by way of a further duct 35 and pipe 36 within the casing at the remote end thereof where it is connected to a delivery pipe 37. The plunger is furnished with two external flats 38 so that when it is resting on the valve seating 29 free communication is established between the spill chamber 34 and the swirl chamber 30 by way of the passages between these flats and the wall of the plunger cylinder, the arrangement being such, however, that when the plunger is in its fully opened position this communication is cut off. The plunger is also furnished with an axial spill passage 39 communicating at its end remote from the seating with two lateral spill passages 40, the arrangement being such that when the plunger is in its fully open position (Figure 1) free communication is established by way of the spill passages between the swirl chamber 30 and the cavity 34 but when the plunger is in closed position the lateral spill passages 40 are closed by the plunger bush 41.

The plunger is connected by a flexible coupling 42 to an axial spindle 6 passing through the casing and furnished at its remote end with an operating handle 16. The spindle carries a cam follower 9 co-operating with a campiece 8 at the remote end of the sprayer or casing, the arrangement being such that when the handle is turned in one direction from a position in which the valve is fully open, a compression spring 43 within the casing moves the plunger instantaneously to close the valve owing to a sufficiently steep face on the cam surfaces. Opening of the valve is effected by rotation of the handle in the opposite direction to move the valve away from its seating due to the appropriate co-operation between cam followers and cam surfaces.

The feed pipe 32 and spill pipe 36 are disposed within the casing in such a manner as to come in contact with the casing only at their two ends, the intermediate portions being separated from the casing by air spaces 44, 45. With this arrangement the rate of heat transfer between the fuel and the surrounding atmosphere is kept sufficiently low for the fuel temperature to remain substantially unaffected by the temperature of the surrounding atmosphere as long as the fuel continues to circulate.

With the arrangement described above after the output has been shut off the fuel continues to circulate and the danger of the fuel becoming overheated is overcome in the manner indicated in the previous paragraph. Also the output can be restored again when required without the slightest delay.

Furthermore the fuel is circulated through the swirl chamber and spill passages before lighting up thus warming the metal of the sprayer to the same temperature as that of the fuel. The pressure in the swirl chamber inlet thus remains at its required value so that upon opening the plunger a finely atomised spray of hot fuel emerges immediately from the jet orifice to cause instantaneous ignition.

Owing to the continuous circulation of the fuel even when the valve is closed the necessity for a surge vessel for absorbing kinetic energy of the fluid when shut off is avoided since the fluid stream is merely deflected from one path to another.

Valves embodying the present invention are particularly applicable to systems where governing is effected by stopping or starting a stream of fluid. In such cases the plunger may conveniently be actuated by a solenoid or other device connected to the governor mechanism.

What is claimed is:

1. A stop valve for fluid comprising in combination a sprayer body, a fuel inlet passage therein, a valve stem in said sprayer body, a valve on said valve stem, a closure member for said sprayer body incorporating a seating for the tip of said valve, a delivery nozzle in said closure member, a return or liquid spill passage for said fluid within said sprayer body, a central axial passage in said valve and stem terminating in a lateral duct communicating with the return passages when the valve and stem are in a retracted position, a bush surrounding the valve and stem and cooperating with the valve to close off flow around the valve and stem when the valve is in such retracted position, and cooperating with the stem to close off the lateral duct when the valve tip is seated on the said seating, the valve stem having grooves for permitting flow through the bush to the return passage when the valve tip is so seated.

2. A stop valve according to claim 1, in which the axial passage in the valve and stem terminates in two opposed lateral ducts, cooperating with the return passage and bush.

3. A stop valve according to claim 1, having liquid supply and return pipes, within but spaced from the said sprayer body.

4. A stop valve according to claim 1, comprising also spring means for closing the valve and means for holding the valve in said retracted position and arranged for tripping to permit instantaneous closing of the valve by the spring means.

ROBERT FRANCIS DARLING.

REFERENCES CITED

The following references are of record in the file of this patent:

UNITED STATES PATENTS

| Number | Name | Date |
|---|---|---|
| 1,250,067 | Wygodsky | Dec. 11, 1917 |
| 1,252,254 | Fisher | Jan. 1, 1918 |
| 1,326,488 | Fisher | Dec. 30, 1919 |
| 1,644,372 | Gray | Oct. 4, 1927 |
| 2,267,451 | Eweryd et al. | Dec. 23, 1941 |
| 2,345,402 | Lubbock et al. | Mar. 28, 1944 |
| 2,391,790 | Martinsson | Dec. 25, 1945 |